United States Patent [19]
Osman et al.

[11] Patent Number: 5,659,718
[45] Date of Patent: Aug. 19, 1997

[54] SYNCHRONOUS BUS AND BUS INTERFACE DEVICE

[75] Inventors: Fazil Osman, Escondido; Christopher H. Bracken, Poway; Michael F. Harris, San Diego; Ronald S. Perloff, Poway, all of Calif.

[73] Assignee: XLNT Designs, Inc., San Diego, Calif.

[21] Appl. No.: 293,015

[22] Filed: Aug. 19, 1994

[51] Int. Cl.⁶ .................................................. G06F 13/38
[52] U.S. Cl. ............................................ 395/551; 395/309
[58] Field of Search ............................. 395/201.01, 280, 395/309, 550

[56] References Cited

U.S. PATENT DOCUMENTS

| | | | |
|---|---|---|---|
| 4,373,183 | 2/1983 | Means et al. | 395/304 |
| 4,719,621 | 1/1988 | May | 370/85 |
| 5,128,935 | 7/1992 | Perloff et al. | 370/85.4 |
| 5,185,863 | 2/1993 | Hamstra et al. | 395/250 |
| 5,187,780 | 2/1993 | Clark et al. | 395/325 |
| 5,193,149 | 3/1993 | Awiszio et al. | 364/DIG. 1 |
| 5,321,819 | 6/1994 | Szczepanek | 395/200.2 |
| 5,371,880 | 12/1994 | Bhattacharya | 395/550 |
| 5,400,340 | 3/1995 | Hillman et al. | 370/105.3 |
| 5,404,463 | 4/1995 | McGarvey | 395/308 |
| 5,408,469 | 4/1995 | Opher et al. | 370/60.1 |

Primary Examiner—Thomas M. Heckler
Attorney, Agent, or Firm—Fish & Richardson P.C.

[57] ABSTRACT

A high performance bus and bus interface device for interconnecting numerous devices without using dedicated high current drivers at each device. The bus is synchronous and divided into a plurality of primary local busses and at least one global bus. Data can be transferred from a first device over a first primary local bus through a first global transceiver, over the global bus to a second global transceiver, and then to a second device through a second primary local bus. The bus is driven to a known state at the end of each burst of data transmitted by a device, before the bus is relinquished to another device. Buffers are provided in each device on the primary local bus which can be accessed by other devices. Buffer management includes: (1) determination by each transmitting device of buffer availability at each receiving device; (2) "claiming" use by the transmitting device of a buffer in the receiving device for transfers from the transmitting device, including locking out other devices from writing to that buffer; (3) capability of the transmitting device to move received data to the buffer in the receiver; and (4) notification to all devices that the transfer is complete. The bus is used to transfer data between ports of a LAN bridge or switch. A dedicated lookup bus allows address lookup logic to be accessed without arbitrating for the data bus. A distributed CAM is used to perform address lookup functions.

30 Claims, 10 Drawing Sheets

SYNCHRONOUS BUS AND BUS INTERFACE DEVICE

BACKGROUND OF THE INVENTION

1. Field of the Invention

The present invention relates to a high performance data transfer bus used to interconnect subsystems, and more particularly to a bus for use within network bridges, routers, switches, computer workstations, or personal computers.

2. Description of Related Art

Most computer based systems include busses for transferring digital data. Such busses may be used for transfers between either closely or loosely coupled components. One example of a bus used to transfer digital data between closely coupled components is the bus used by some microprocessors to access instruction and data memory. This type of bus is commonly referred to as a processor bus. Conventional busses, such as VME, EISA and Multibus II are examples of busses used to transfer digital data between more loosely coupled components within a computer, such as disk controllers and local area network interfaces. Proprietary busses are also frequently used to transfer data between loosely coupled components, especially in networking devices.

In most cases, the devices connected to a bus perform dedicated functions and are somewhat autonomous from other devices, though functions performed by these devices usually involve the exchange of data with other devices on the bus. FIG. 1 shows two simple workstations 100a, 100b, each containing a processor device 110, local area network interface 120 and disk controller 130 connected with a bus 140. The two workstations are connected by the local area network cabling 150. An example of an exchange of data from workstation 100a to workstation 100b includes the following steps: (1) creating a data file using a first processor 110a; (2) transferring the data file from the first processor to a first LAN interface 120a over bus 140a; (3) preparing and transmitting the data file over a local area network 150; (4) receiving the data file in a second LAN interface 120b; (5) transferring the data file over the bus 140b to a second processor 110b; (6) reconstructing and processing the data file using the second processor 110b; (7) transferring the processed data file from the second processor 110b over the bus 140b to a disk controller 130b; and (8) storing the file.

In many systems, the transfer of data from the second LAN interface 120b to the second processor 110b is concurrent with the transfer of data from the second processor 110b to the disk controller 130b. However, since the bus 140b can accommodate only one transfer at a time, such transfers may not occur simultaneously. That is, the second LAN interface 120b may transfer a portion of the file to the second processor 110b, then the second processor 110b transfers processed data to the disk controller 130b while the second LAN interface 120b is waiting for additional data to be received from the first workstation 100a.

It is likely that at times a transfer will be occurring between the second processor 110b and disk controller 130b at a time when the second LAN interface 120b is ready to make a transfer to the second processor 110b. Therefore, the second LAN interface 120b requires access to the bus 140b at the same time that the transfer between the second processor 110b and the disk controller 130b is taking place. Because of the possibility of such contention, an arbitration method is provided to determine when a device is allowed to transfer data over the bus 140. FIG. 2 shows the components of a conventional bus connected device, such as a LAN interface 120. The bus 140 can be divided into two portions, an arbitration bus 240 and a data bus 250. The bus arbitration method is supported by bus interface logic 200 within the LAN interface 120. A transfer out from the LAN interface 120 starts when device logic 230 places data into one or more data buffers 220 within the LAN interface 120, and then signals the bus interface logic 200 that a transmit operation is required. The bus interface logic 200 then requests use of the bus 140 over the arbitration bus 240. When permission to transmit is received, the bus interface logic 200 reads the data from the buffers 220, and places the information on the data bus 140 through high current bus transceivers 210. Bus transceivers 210 are required which have high current drive capability because of the electrical characteristics of most busses. The drivers must be provided in the bus transceivers 210, rather than being integrated in the VLSI bus interface logic 200, because of the logic limitations of VLSI implementations of the bus interface logic 200. That is, the VLSI chips on which the bus interface logic 200 is typically fabricated do not have the ability to supply the current required to drive the bus 140.

It is important that data be transferred over the bus efficiently. To provide system performance, the transfer rate on the bus should be faster than the rate at which any one device on the bus can produce or consume data. Accordingly, the relative speed of the bus 140 with respect to devices on the bus 140, and the maximum size of a transfer over the bus 140, requires that the devices on the bus 140 include data buffers 220. This permits a transmitting bus device 120 to accumulate data in the data buffers 220 and burst the data across the bus 140 at the highest available bus rate. Likewise, a receiving bus device can receive the burst of data at the highest available bus rate in the data buffers 220 and access the dam from the data buffers 220 at the slower device speed. Usually, a bus arbitration procedure includes having the destination device allocate the receive data buffer 220 needed for the transfer.

Systems that use a bus to transfer data between devices have been improved over time, resulting in faster data transfer capability. At some point, it becomes advantageous to increase the speed of the bus. Therefore, it is important to provide a degree of scalability within the bus (capability to adapt to different speeds), while keeping the interface 200 between the bus and the device 230 connected to the bus simple and easy to implement.

However, several problems are encountered with conventional busses. For example, the speed of a bus is limited by a number of factors, the most fundamental of which is the electrical drive requirements of the bus (i.e., the amount of current required to drive the bus high or pull the bus low in a fixed amount of time). A device that is transmitting information over a bus must have sufficient drive capability to drive the load presented by all of the receivers on the bus. Conventional busses that allow a relatively large number of devices to be interconnected over the bus require use of either high current drivers on each bus interface logic chip, or external transceivers 210 (as shown in FIG. 2), capable of driving the bus. Using high current drivers on a VLSI chip increases the cost and complexity and reduces the reliability of the VLSI chip. External transceivers increase both the cost of the system and the area (i.e., real estate on a printed circuit board, etc.) required to implement a device.

Also, the turn-off and turn-on time of the drivers must be properly accounted for to ensure that damage does not occur to a bus driver due to more than one driver being turned-on at the same time. For example, if one driver is attempting to pull the bus down while another driver is attempting to drive the bus high, the current through the drivers may cause damage to one or both of the drivers. Accordingly, when a first device stops transmitting and a second device starts transmitting, time must be provided for the first device to turn off its drivers before the second device turns on its drivers. Otherwise, the reliability of the system is affected. The time required to ensure that such overlap does not occur does not scale with the speed of the bus. Thus, the bus performance does not scale in proportion to the speed of the bus. Accordingly, driver turn-on and turn-off time is a significant barrier to higher performance in conventional busses. Furthermore, at each clock speed, the performance is affected by chip delay, number of devices on the bus, etc.

Furthermore, conventional busses typically rely upon buffer management which is done in software. Software implemented buffer management is very flexible, but limits device and system performance. For example, allocating a buffer to receive data in accordance with a conventional software buffer management scheme requires a query and possibly a response over the bus. Conventional techniques also require the polling of a semaphore bit or communication with a centralized buffer manager to perform buffer allocation. This overhead slows the maximum transfer rate of a device and adds significant complexity.

A further problem with conventional busses is that access latency (i.e., the amount of time a device may have to wait before being granted the bus) may become excessive. For example, in conventional busses, one way of locking out other devices from using a buffer is to transfer all the data that will be stored in the buffer without giving up the bus to another device. This creates high access latency for other devices. In many systems, it will also add to the latency of the end-to-end transfer of data through the system. This is especially true with devices that can begin processing received data before completion of the transfer.

Therefore, it would be advantageous to provide a high performance data transfer bus capable of interconnecting up to hundreds of devices without the need for high current drivers at every interface. It would also be advantageous to provide a technique to minimize bus access time and simplify lock-out of other devices from a buffer at a receiver. Still further, it would be advantageous to remove driver turn-on and turn-off time as a significant barrier to high performance on a data transfer bus. Still further, it would be advantageous to provide a high performance data transfer bus which includes buffer management that is simple and easy to implement in hardware.

SUMMARY OF THE INVENTION

The present invention is a high performance bus intended to interconnect up to hundreds of devices, without the need for dedicated high current drivers at each device. Elimination of the need for high current drivers at each device (together with other advances provided by the present invention) allows the bus logic of the present invention to be implemented in a VLSI chip using a high level of integration.

In accordance with the present invention, the bus is synchronous and is divided into a plurality of primary local busses and at least one global bus. A plurality of devices are each connected to one primary local bus through a primary local bus interface chip. Each primary local bus interface chip has a low power driver which transfers one word per clock cycle over the primary local bus. Each word is then transferred to another primary local bus interface chip or a "Global" transceiver. Each Global transceiver is also coupled to a global bus. Accordingly, data can be transferred from a first device, through a first Global transceiver coupled to the first device over a first primary local bus, to a second Global transceiver over the global bus, and then to a second device coupled to the second Global transceiver by a second primary local bus. The number of devices coupled to each primary local bus is limited by the drivers in the local bus interface chip to a small number, while the global bus provides for expansion for up to hundreds of devices. In accordance with the preferred embodiment of the present invention, the Global transceiver can drive a large number of devices. Each primary local bus interface chip drives only a small load during each clock cycle.

Furthermore, the architecture of the present invention removes driver turn-on and turn-off time as a significant barrier to higher performance. The present invention uses a clocked transceiver approach in which a full clock cycle is provided for driver turn-off and turn-on. Therefore, because each primary local bus interface chip drives a small load, and a full clock cycle is provided for driver turn-off and turn-on, the performance of the bus in accordance with the present invention is essentially proportionally scalable. That is, increasing the clock speed increases the performance accordingly. Still further, in accordance with the present invention, the bus can automatically adapt to multiple levels of clocked drivers. Thus, the present inventive bus architecture may be expanded to accommodate virtually any number of bus devices.

An additional feature of the present invention is that the bus is driven to a known state at the end of each burst of data transmitted by a device, and prior to the bus being relinquished to another device. Accordingly, the output of each driver may be placed in a high impedance state during the one clock cycle that is provided for driver turn-off and turn-on, and a relatively large pull-up resistance may be used to control the logic state of the bus. Using a relatively large pull-up resistance on the bus allows the drivers to have less current capacity and still control the bus.

In accordance with the present invention, buffers are provided in each device coupled to the primary local bus. These buffers can be accessed by other devices and are managed in accordance with a simple and easy to implement hardware design. The basic bus related buffer management features include: (1) determination by each transmitting device as to whether a buffer is available at each receiving device; (2) "claiming" use by the transmitting device of a buffer in the receiving device for the transfer from the transmitting device, including locking out other devices from writing to that buffer; (3) capability of the transmitting device to move received data to the buffer in the receiver; and (4) notification to all devices that the transfer is complete.

The present invention uses a unique Busy bit technique to minimize setup time and simplify lockout of other devices from the buffer at the receiver. Each device maintains a "Busy" bit associated with each potential device on the bus. Each Busy bit associated with a particular device is set when any device begins a transfer to the buffer of the associated destination device. Busy bits are reset when the transfer is complete (i.e., at the end of the transfer). In accordance with the present invention, the beginning and ending of a transfer can be determined by monitoring "Type" bits provided on the bus. Type bits are set to a predetermined logical state to indicate whether the beginning, middle, or end of a transfer is occurring. Since the end of a burst can be identified by the Type bits, the bus can accept variable length bursts.

In one embodiment of the present invention in which the bus is used to transfer data between ports of a local area network bridge or switch (such as an Ethernet switch or bridge), a dedicated lookup bus is provided to allow address lookup logic to be accessed without the need to arbitrate for the data bus. The address lookup logic is used to determine which ports (or devices) are associated with which stations in the local area network (LAN). In the preferred embodiment of the present invention, a distributed content addressable memory (CAM) is used to perform address lookup functions. That is, when a port logic device receives a frame over the network segment, and a determination is made that the destination station to which the burst is addressed is not included in the segment of the network that is coupled to that port logic device, then a request is made over the lookup bus to determine which port logic device is coupled to the segment which includes the destination station. In accordance with the preferred embodiment, each port logic device includes a CAM which contains the address of each station that is included in the network segment coupled to that port logic device. Thus, when a lookup request is place on the lookup bus, each port logic device checks the CAM within that port logic device to determine whether the network segment that includes the station referenced in the request is coupled to that port logic device. If so, then that port logic device responds to the lookup request with a message that includes the address of that port logic device. Each port logic device is responsible for teaming which stations are included in the network segment coupled to that port logic device by monitoring each frame that is transmitted by the stations of the network segment.

Furthermore, in accordance with the present invention, a header associated with each transfer includes information regarding the transfer. For example, in accordance with one embodiment of the present invention, virtual networks (i.e., a segment of the LAN which is separately identifiable and which preferably includes each station coupled to one or more ports of the network bridge or switch) may be created. A network identifier within a network identification field in the header determines with which virtual network the transfer is associated. In an alternative embodiment of the present invention, a virtual network may comprise only some of the stations coupled to one or more ports.

The present invention also provides a single "Multicast Busy" bit which is common to all the devices on the bus. The Multicast Busy bit indicates whether a transfer is a multicast (i.e., transmission which may be of interest to all of the stations on the LAN). In one embodiment of the present invention, the Multicast Busy bit may be set for devices which are included within a particular virtual network or group of virtual networks, and cleared for each other device on the bus.

In yet another embodiment of the present invention, the header of a transmission may include information regarding the retry policy to be applied with respect to that transfer. Thus, the retry policy may be tailored to the type of transfer.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Overview

Figure 1:
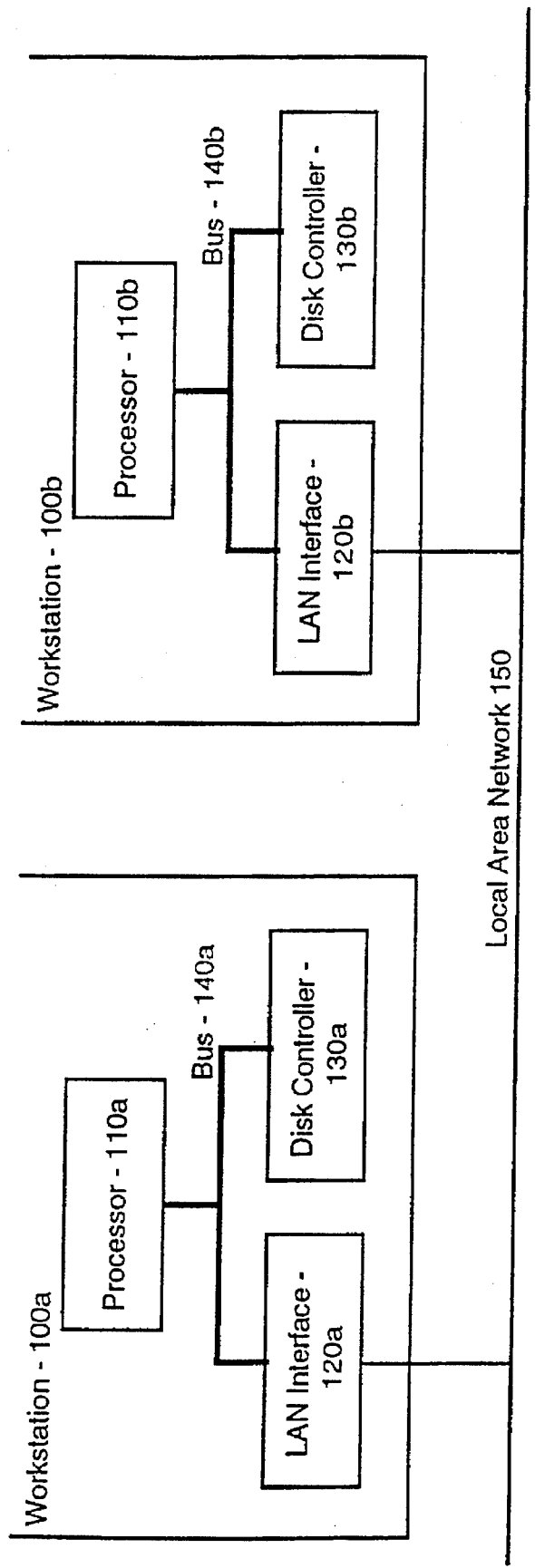
FIG. 1 shows two simple workstations, each containing a processor device, local area network interface, and disk controller connected with a bus, in accordance with the prior art.
Figure 2:
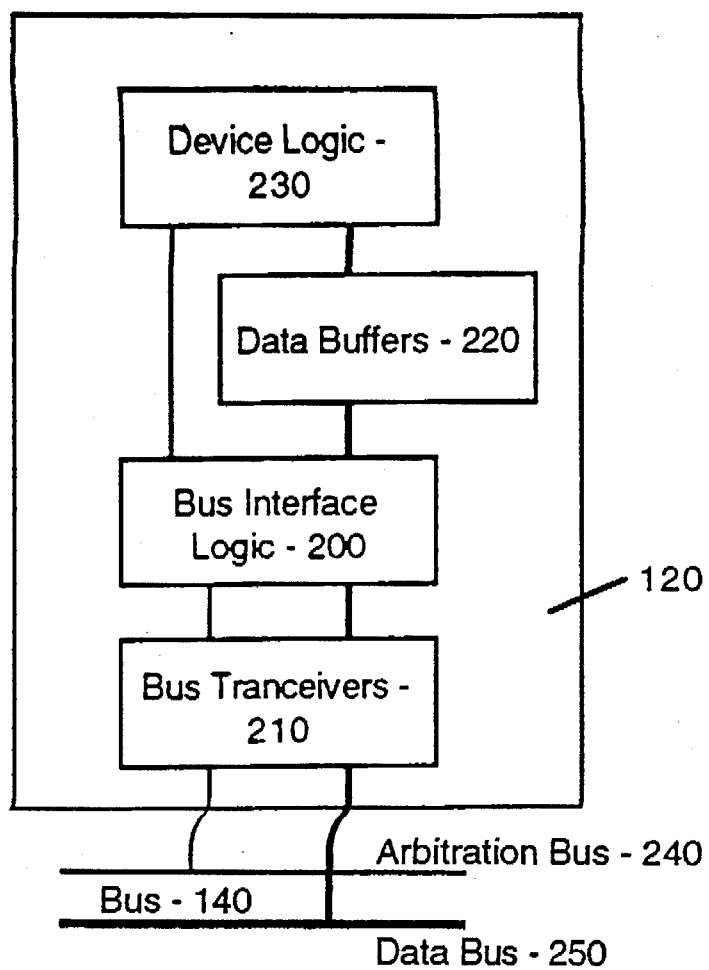
FIG. 2 shows the components of a conventional bus connected device, such as a processor.
Figure 3:
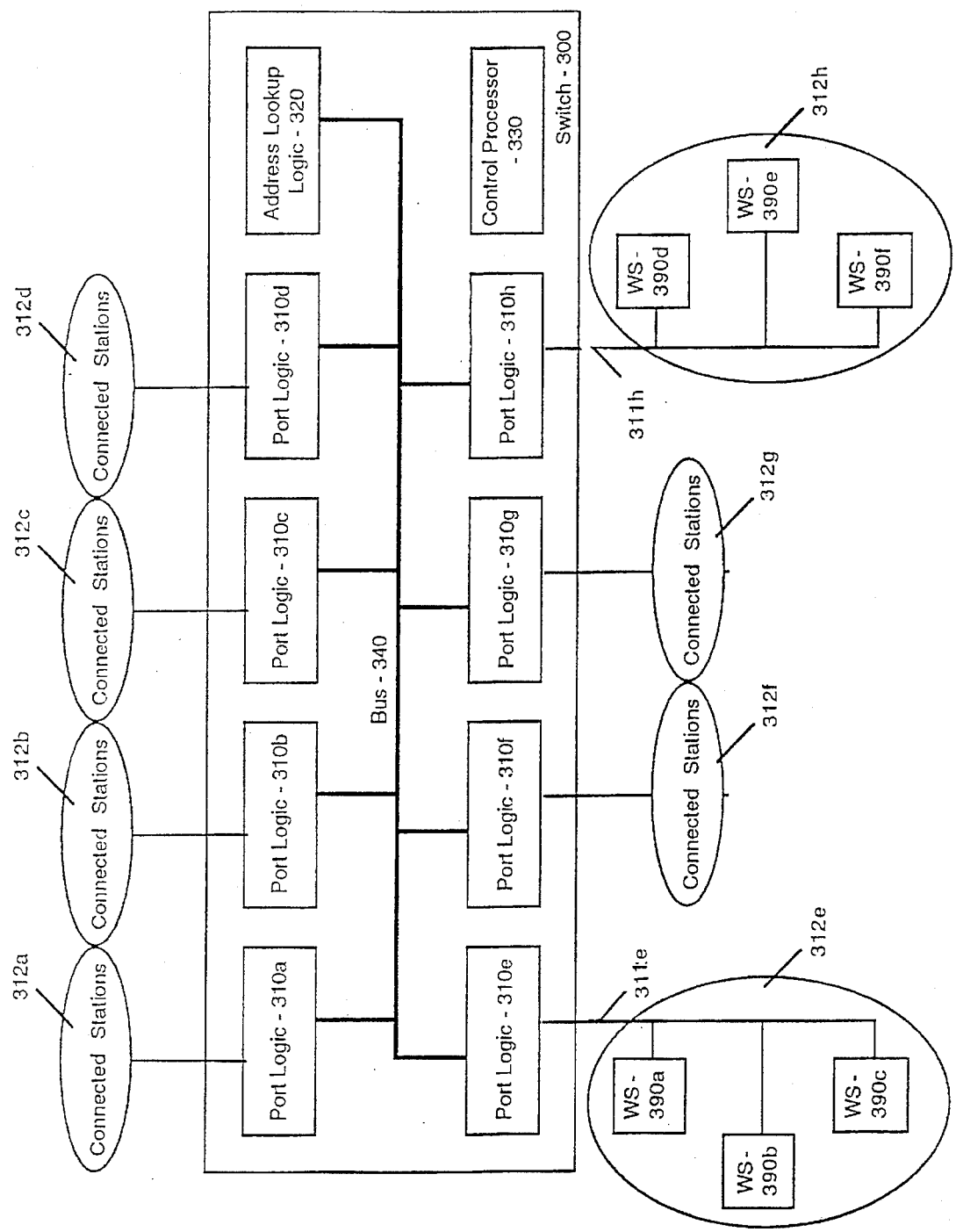
FIG. 3 is an illustration of the inventive bus architecture within a local area network switch, in accordance with the present invention.

The present invention is a bus architecture that is compatible with a broad range of systems including personal computer systems, mini-computer systems, and network switching systems. FIG. 3 is an illustration of the inventive bus architecture within a local area network switch 300, such as an Ethernet switch. For the purpose of clarity and ease of understanding, the present invention is described in the context of an Ethernet local area network switch (an "Ethernet switch"). However, it will be clear to one of ordinary skill in the art that the present invention may be adapted for use in many other systems and devices.

A LAN switch (also commonly referred to as a multiport bridge or LAN bridge) allows information to flow from one group of stations which form a first LAN segment 312 to other such LAN segments 312. Each LAN segment 312 is separated by the LAN switch 300 to reduce maintenance, operational, and physical limitations and difficulties that result from a large number of stations being coupled directly to one another. The operation of such LAN switches is well known to one skilled in the art of networking, and many of its operational functions are specified in the IEEE 802.1d standard on bridging. The illustrated switch has eight LAN port logic devices 310a–310h. Each port logic device 310a–310h is connected to a LAN segment 312a–312h. For example, the port logic device 310e includes a connection over a LAN medium 311e to the LAN segment 312e that includes three workstations 390a, 390b, 390c. Each port logic device 310a–310h also connects to a local bus 340 to allow the exchange of data between the port logic devices 310a–310h.

When one workstation 390b is communicating with another workstation 390a within the same LAN segment 312e, the communication is completed on the LAN segment 312e without any support from the switch 300. However, when one workstation 390b sends a frame to another workstation 390d in another LAN segment 312h, the switch 300 switches the frame between the two segments 312e, 312h. To determine whether a frame requires the support of the LAN switch, the port logic device 310e examines each frame transmitted on the associated LAN segment 312e. In accordance with one embodiment of the present invention, the port logic device 310e utilizes a global address lookup logic 320 to determine where the destination station 390 (i.e., the station to which the frame is to be sent) is connected. If, for example, the destination address is that of workstation 390b, the location in the address lookup logic would be that of the port logic device 310e. If the destination address were that of workstation 390e, the location would be that of the port logic device 310h. In the first case, the port logic device 310e does not need to forward the frame, while in the second case, the port logic device 310e does need to forward the frame to port logic device 310h. After the port logic device 310h receives the frame from the port logic device 310e, the port logic device 310h transmits the frame onto the segment 312h associated with port logic device 310h, and more particularly, to workstation 390d. A data transfer between the port logic device 310e and the address lookup is required to determine to which port logic device 310 the destination station is coupled. This transfer preferably occurs over a local bus, such as the "Local Switch" bus 340 in the illustrated embodiment of the present invention. In addition, the transfer between a first port logic device 310e and a second port logic device 310h is accomplished using the Local Switch bus 340.

Description of the Port Logic Device

Figure 4:
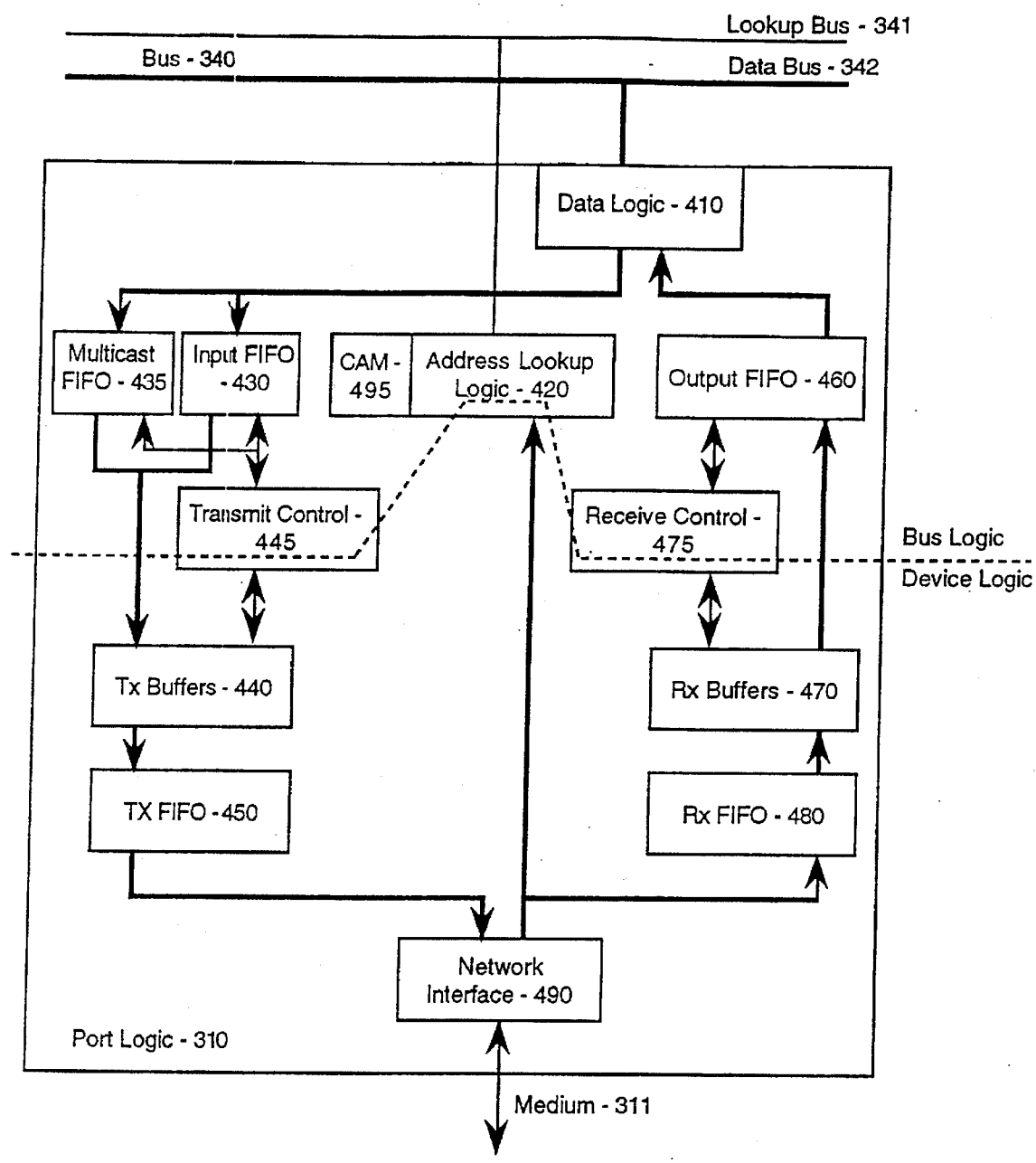
FIG. 4 is a block diagram of a port logic device in accordance with the present invention which is configured to interface to a LAN medium.

FIG. 4 is a block diagram of a port logic device 310 in accordance with the present invention which is configured to interface to a LAN medium 311. Because the present invention is a local bus architecture which may be used with different external busses, protocols, and accordingly different device types (i.e., with Ethernet devices, disk devices, display devices, etc.), it is appropriate to distinguish between device components and functions, and bus components and functions. As described herein, device components and functions are specific to the type of device with which the present invention is being used (e.g., Ethernet). In contrast, as described herein, bus components and functions refer to components and functions that are associated with the local switch bus 340 and are appropriate regardless of the type of device. It will be understood by those skilled in the art that the present invention is illustrated in the context of a LAN only for the purpose of explaining the functions and operation of the present invention.

In accordance with the example illustrated in FIG. 4, the port logic device 310 comprises a network interface 490 (such as an Ethernet Interface), a transmit storage area (such as a transmit buffer) 440, a transmit first-in, first-out device (FIFO) 450, a receive storage area (such as a receive buffer) 470, and a receive FIFO 480. In addition, a transmit control device 445 and receive control device 475 preferably have at least some bus functions and some device functions. Accordingly, the device functions may be replaced with appropriate functions when a different device type is used (e.g., processor). In accordance with the illustrated embodiment of the present invention, the network bus interface 490 receives and transmits frames on the LAN medium 311.

Received frames are stored in the receive buffers 470 after entering the port logic device 310 through the receive FIFO 480. Transmitted frames are taken from the transmit buffers 440 into the transmit FIFO 450 and placed on the LAN medium 311 by the Network bus interface 490.

In other device types, the buffers may not be necessary, for example, the output FIFO 460 may provide sufficient buffering in accordance with the device characteristics. Also, those portions of the address lookup logic 420 which perform functions provided when the port logic device 310 is a particular type of LAN device could change as required by the characteristics of the device, network bus protocol, etc.

In accordance with the illustrated embodiment, as a frame is received at the Network bus interface 490 the frame is written to the receive FIFO 480. During reception, local address lookup logic 420 processes the source and destination addresses of the frame. The source address is used to learn which stations are connected to the LAN segment coupled to the receiving port logic device 310. In one embodiment of the present invention, this information is transmitted to a global address lookup logic device 320 (as shown in FIG. 3). Techniques for learning which stations are connected to a port logic device 310 are well known in the art. The destination address is used to determine whether the frame should be copied for forwarding to another port logic device 310. Techniques for copying a frame are also well known within the art. However, the manner in which the address lookup is implemented to make this forwarding decision is unique to the present invention, as is described in detail below. The receive control 475 performs the following functions: (1) coordinates the reception of information from the Network bus interface 490 in known fashion, (2) uses the forwarding information from the address lookup logic 420 to determine whether the frame is to be forwarded to another port logic device 310, (3) generates a header if the frame is to be forwarded, (4) controls writing of the received data into the receive buffers 470, (5) places transfers from the port logic device 310 to other port logic devices 310 through the data logic device 410 on a queue, and (6) controls the reading of data from the receive buffers 470 into the output FIFO 460.

The transmit side of the port logic device 310 has a similar data flow. Transfers from other port logic devices 310 are taken from the data bus 342 by the data logic device 410 and stored in the input FIFO 430. The transmit control 445 writes data from the input FIFO 430 into the transmit buffers 440, and when frame transmission is to be initiated, the transmit control 445 reads data from the transmit buffers 440 into the transmit FIFO 450 and causes the Network bus interface 490 to initiate a frame transmission.

One skilled in the art will recognize that similar setup operations are performed for bus transfers with other device types (i.e., port logic devices, such as disks, processors, etc.). It should be understood by those skilled in the art that so long as sufficient information is available from the network interface 490 (which in the illustrated embodiment is an Ethernet interface) for the first transfer on the data bus to take place, and the destination port logic device 310 (i.e., the port logic device which is coupled to the segment which includes the destination station 390) is known to the port logic device 310 before the transfer is to begin, the inventive port logic device 310 can begin transferring data.

In the preferred embodiment of the present invention, all of the port logic devices 310 include a content addressable memory (CAM) 495 which is capable of indicating which stations are included in the network segment that is coupled to the port logic device 310 that includes the CAM 495 and responding to requests made on a dedicated address lookup bus 341. Operation of this "distributed" address lookup CAM is discussed in detail below.

Lookup Bus

Address lookups are performed over the dedicated lookup bus 341. The global address lookup logic 320 coupled to the bus 340 responds to a request from a port logic device 310 for information regarding the address oft he port logic device 310 to which the destination station 390 is connected. When a frame is received within a port logic device 310, the address lookup logic 420 within the port logic device 310 indicates whether the destination station is included within the network segment that is coupled to the port logic device 310. If so, then the local address lookup logic 420 signals the receive control 475 to abort the frame reception since the switch 300 is not needed for the operation. When a frame is to be forwarded, the receive control 475 uses the address lookup response to start a bus transfer.

In some applications of the current invention, the lookup bus is not appropriate. For example, where the device is at the end of the data transfer (e.g., a disk), a table of all devices could be maintained locally within each device 310. In some cases, data within the frame may imply the destination device. For example, a connection identifier or the type of data (e.g., video data is routed to the video processor) may provide the identity of the destination device. However, whenever the destination is determined from the data itself (e.g., through the local area network addresses), the lookup bus is preferably included in the bus implementation. Alternatively, the lookup function could be performed over the data bus.

Figure 5:
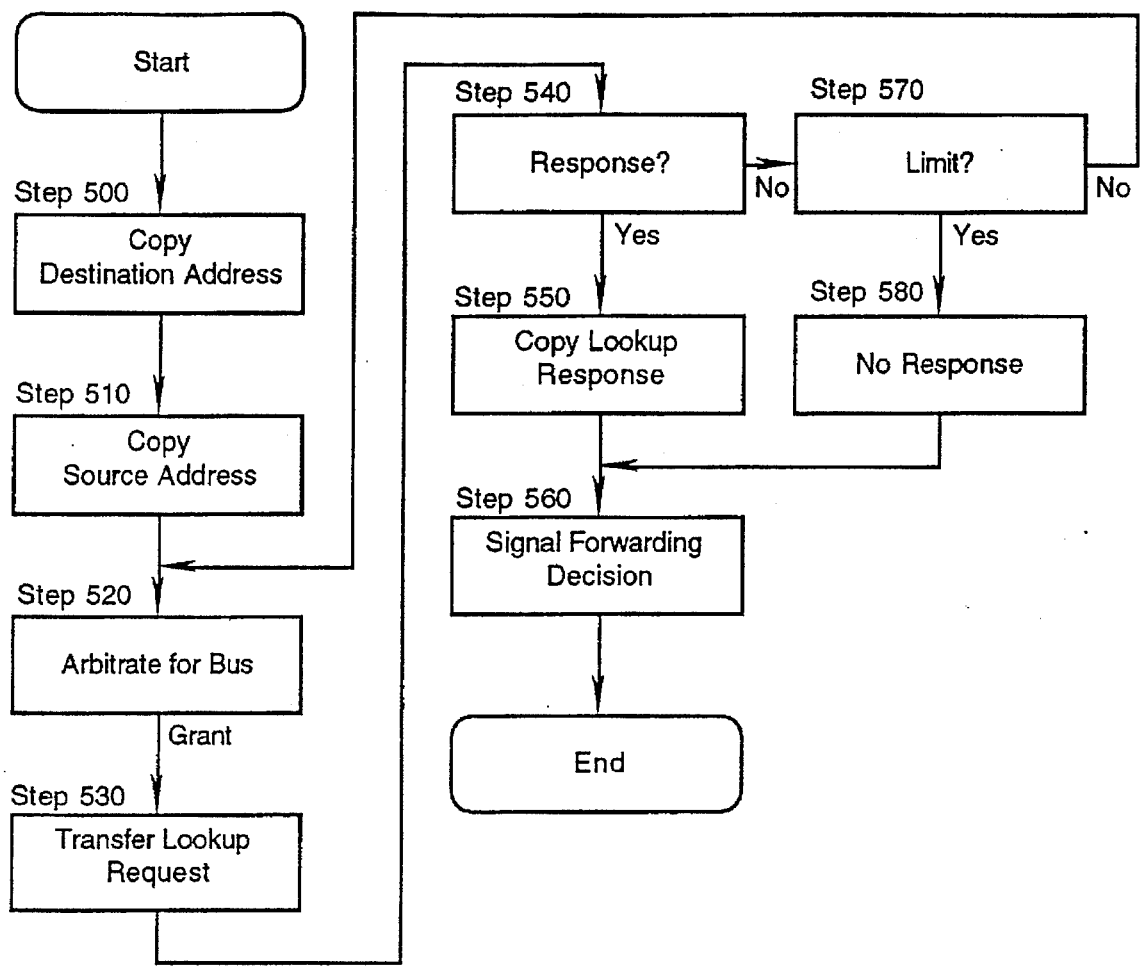
FIG. 5 illustrates the steps performed when a request is made by a port logic device of the present invention over the inventive lookup bus.

The steps performed when a request is made by a port logic device 310 over the lookup bus 341 are shown in FIG. 5. The address lookup logic makes a copy of the destination address (STEP 500) and source address (STEP 510) from the frame during reception, and arbitrates for the lookup bus 341 (STEP 520). Bus arbitration can be performed by any method, many of which are well known to those skilled in the art. Once the bus 341 is granted to the port logic device 310, the port logic device 310 transmits a lookup request on the bus 341 (STEP 530).

Figure 6:
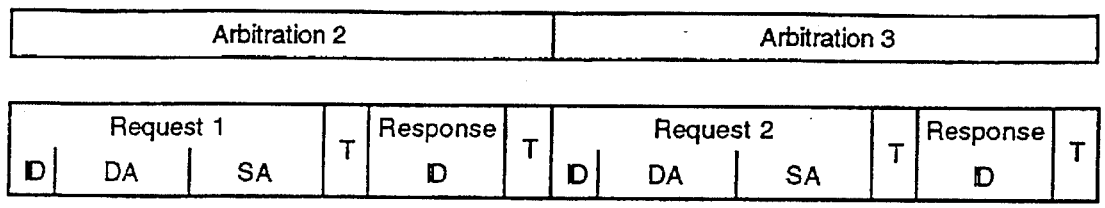
FIG. 6 illustrates the basic timing relationship of arbitration and lookup accesses.

In the preferred embodiment, arbitration is pipelined with lookup requests and responses. FIG. 6 illustrates the basic timing relationship of arbitration and lookup accesses. While one lookup is being performed, arbitration proceeds for the next opportunity to use the lookup bus. A lookup request message includes a field which identifies the requesting port (ID), the destination (DA) and source addresses (SA) associated with the frame. The lookup data bus timing then requires a period to turn the bus 341 around (T) so that the response can be sent. After the response, there is another bus turn around period (T) before start of the next lookup.

In one embodiment, the global address lookup logic 320 is a CAM. As is well known to one skilled in the art, the CAM preferably uses the destination address to access its database. It responds with the destination port logic device associated with that address or a value indicating that the destination port logic device is unknown. The CAM within the address lookup logic 320 uses the source address and requester port identification to perform a learning function in known fashion.

The lookup bus has a configurable time-out period within which to respond after receipt of a request from a port logic device 310. If the requester does not receive a response within that time-out period (STEP 540), it will test to see if a maximum number of lookup attempts has been reached (STEP 570). If the maximum has been reached without a response, it is assumed that no response will be forthcoming (STEP 580). A decision is then made to either abort the frame or to forward the frame to another port logic device 310 (STEP 560) based upon the policy for no response. In a LAN switch using the bus 340, this will normally result in the frame being flooded to all ports logic devices 310, though in an alternative embodiment the transfer will be aborted. In the preferred embodiment the maximum is set at one attempt.

If a response is received before the time-out, of STEP 540, then a copy of the response is made (STEP 550). A decision is made to either abort the frame or to forward the frame to another port logic device 310 (STEP 560). The port logic device is then ready to make a next request regarding a next frame.

In an alternative embodiment of the invention, the global address lookup logic device 320 could be located in multiple places. For example, the global address lookup logic device 320 could be split into two cooperating CAM functions, each with its own lookup bus interface. All lookup bus transactions would be broadcast to support this capability. However, when the lookup database is distributed over multiple bus interfaces, the likelihood of a time-out is greater.

In another alternative embodiment, a local CAM 495 is maintained within one or more of the port logic devices 310. Preferably, each port logic device includes a local CAM 495 which has a list of each of the stations 390 on the medium 311. As each station 390 transmits a frame, the frame is received in the associated port logic device 310. The port logic device 310 identifies the station 390 from information within the frame. A copy of the source address is made within the port logic device 310. If the source address is not included in the local CAM 495, then that address is added. Thus, each port logic device 310 "learns" which stations 390 are included in the network segment 312 that is coupled to that port logic device 310, in known fashion.

The port logic device 310 also compares the destination address of received frames against the local CAM contents. If the address is in the local CAM 495, then lookup logic 420 causes the receive control 475 to abort the frame. Thus, the port logic device 310 performs a filter process, as is well known in the art. If the address is not contained in the local CAM 495, the address lookup logic transmits a lookup request on the lookup bus 341. The address lookup logic 420 within each of the other port logic devices 310 compares the address within the lookup request to the contents of the local CAM 495 of that port logic device 310. If the address is known by any of the port logic devices, then the port logic device that knows the address (i.e., has that address within the associated local CAM 495) responds to the lookup request with that port logic device's identification. This response allows the frame to be forwarded to the responding port logic device 310. The present invention preferably uses a true two port local CAM 495. A first port is dedicated to the learning/filtering functions, while a second port is dedicated to the lookup function. Such a two port local CAM 495 ensures that sufficiently low latency is provided such that good system performance can be achieved.

In accordance with the present invention, when stations move quickly from one location to another, it is possible that the local CAM 495 enters associated with a station 390 will exit in two port logic devices 310 for a brief period of time.

This situation will exist until the old port logic device learns that the station 390 is gone. When a requesting port logic device 310 of the present invention receives more than one response to a request, the frame is transmitted to all port logic devices 310.

In yet another alternative embodiment of the present invention, a centralized CAM is provided in addition to local CAMs within at least some of the port logic devices 310. The centralized CAM is used to provide the address of a port logic device 310 when it would be inconvenient to maintain that information within the local CAM 495 of the port logic device 310. For example, situations may arise in which the local CAM 495 within a port logic device 310 is not large enough to support all of the stations 390 included in the network segment coupled to that port logic device 310. In such a hybrid lookup scheme, a local CAM 495 learns each of the stations 390 until it is full. At that time, additional station addresses are added to a centralized CAM. Thus, the benefits of local filtering and lookup can be attained while maintaining the flexibility of a centralized CAM.

The lookup bus 341 is designed to minimize external logic and provide good rate scaling. This is achieved through the use of a synchronous bus and clocked transceiver techniques common to the lookup and data busses 341, 342 as described in greater detail below.

Data Bus

The data bus architecture of the present invention provides the following unique features: minimized latency, reduced bus driver design restrictions, rate scalability, integration of efficient buffer management functions and support of device specific data management functions.

To minimize device latency, each transfer on the bus 340 of the present invention is limited to a burst preferably comprising a relatively small number of bus clock cycles. In one example of the present invention, a valid frame (such as an Ethernet frame) can range from 64 to 1518 bytes in length. Accordingly, the frame must be segmented into a plurality of bursts on the bus 340 which taken together transmit an entire frame. An appropriate maximum burst size for the preferred embodiment is 16 clock cycles with a bus width of 4 bytes (32 data bits). However, it will be understood by those skilled in the art that a burst may comprise any number of clock cycles during which one bit is transmitted on each data line. In addition to the 32 data bits per clock cycle, the bus 340 also includes some "Type" bits to convey status signals and information about the transfer to other bus devices.

Segmentation of a frame into bursts requires a mechanism to control multiple sources of data attempting concurrent frame transfers to the same destination to ensure that a frame is reconstructed properly. In accordance with the present invention, Busy bits are used to ensure that an entire frame is received before the receive buffer 480 is allocated to store a transmission from another source. Each potential data source on the bus 340 maintains a Busy bit for each destination port logic device input FIFO 430. In the simple case, this is a single bit for each potential port logic device 310. Each data logic device 410 examines every bus transfer and sets the Busy bit associated with the destination port logic device 310 upon receipt of the first burst of a frame to the destination port logic device 310, and clears the Busy Bit on the last burst of the frame to the destination port logic device 310. Thus, the Busy Bit associated with a port logic device 310 receiving a frame is set at each port logic device 310 when the transmission of the frame begins and is reset at each port logic device 310 when the transmission of the frame ends.

Figure 7:
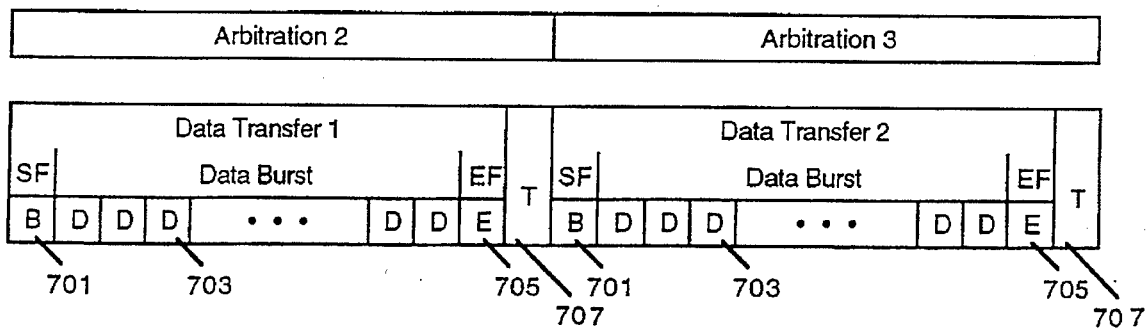
FIG. 7 illustrates the basic operation of the data bus of the present invention.

FIG. 7 illustrates the basic operation of the data bus 342. In the preferred embodiment arbitration is pipelined with data transfers. Accordingly, arbitration period 2 will result in subsequent data transfer 2, and while data transfer 2 is occurring, arbitration (arbitration 3) for the next transfer (transfer 3, not shown) is performed. A data transfer preferably consists of three parts: (1) a start field 701 (SF), (2) the variable length data burst 703, and (3) an end field 705 (EF). In one embodiment of the present invention, these three fields are sourced as 32 bit data bus words on a data bus 342 having 32 data bit lines. Each of these data bus words is identified by Type bits carried on additional signal lines of the data bus 342. The Type bits identify the beginning of a burst (B), the burst data (D) and the end of a burst (E). After each transfer, there is a turn around period 707 before the next transfer begins. The length of a burst may vary since the end is detected by the end field 705 rather by the number of received words.

The start field 701 and end field 705 of a burst contain information related to the data burst that is both specific to the local bus and to the medium 311. For example, the start field 701 contains a source and destination port identification. The destination port identification is necessary for processing the burst, while the source port identification is useful in monitoring bus activity. Therefore, this information is considered to be specific to the local bus. When the preferred embodiment is used with Ethernet, it is necessary to convey that the Ethernet frame is a multicast. This information is particular to the medium 311. Other medium specific information supports special features like virtual networking, as will be described below.

The Type bits used to identify the start and end fields 701, 705 of a burst, also may be used to identify transfer states. For example, the start field 701 may identify either the beginning of a frame or the beginning of a burst. Clearly, the beginning of a frame is always the beginning of a burst as well. The beginning of a frame preferably causes Busy bits to be set. Correspondingly, the end field 705 may identify either the end of a frame or the end of a burst. Clearly, the end of a frame is always the end of a burst. The end of a frame preferably causes Busy bits to be cleared. It should be clear that since frames may be segmented over a plurality of bursts, the beginning or ending of a burst is typically not indicative of the beginning or ending of a frame. Thus, in the preferred embodiment of the present invention, distinct bits are used to signal the beginning of a frame and the beginning of a burst. In one embodiment, the same bit may be used to indicate whether the beginning and ending bit are indicative of the beginning or ending of a frame or a burst. Thus, three bits may be used to indicate the beginning and ending of both flames and bursts. Since the present invention preferably detects the end of a frame by monitoring the Type bits, a frame may be of variable length without creating any difficulty in detecting the end of a frame.

Figure 8:
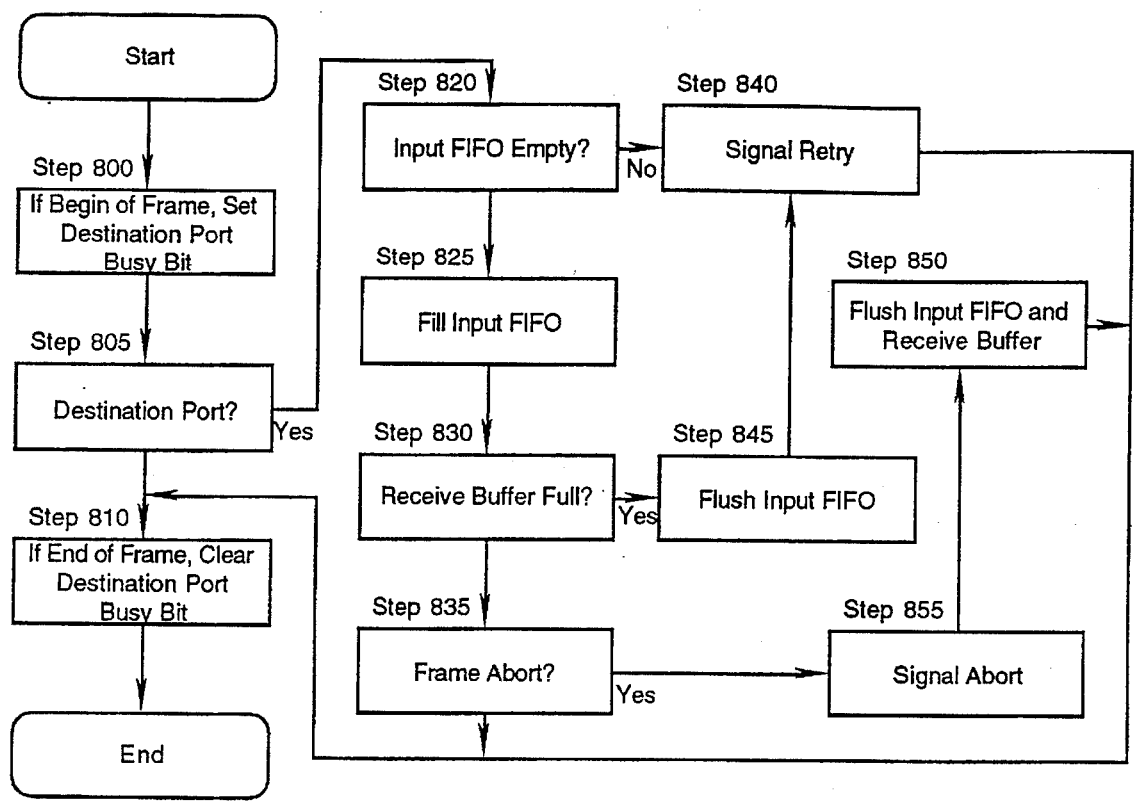
FIG. 8 shows the steps taken by all local bus devices to process a burst in accordance with the present invention.
Figure 9:
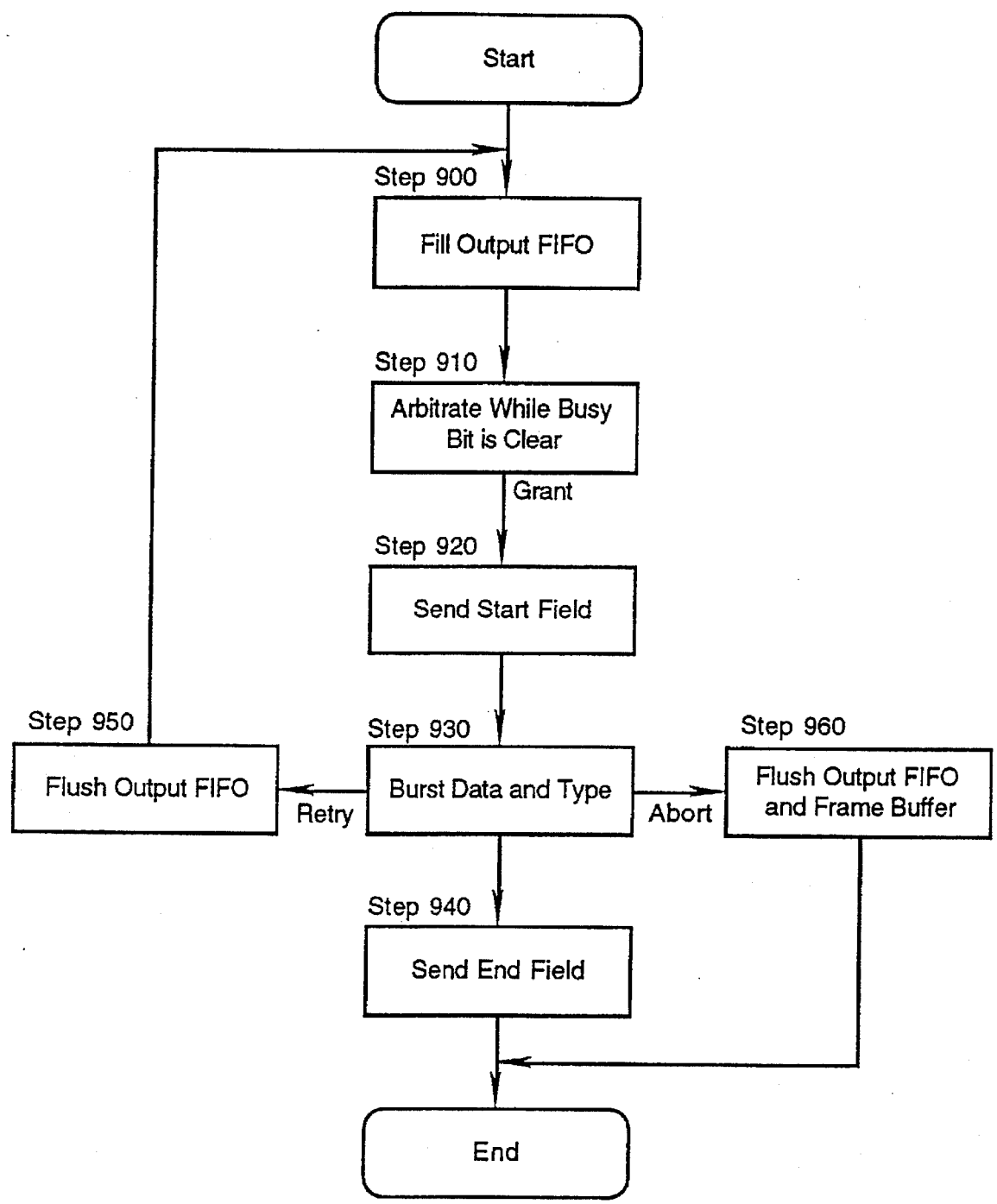
FIG. 9 shows the steps taken by a local bus device when sourcing a burst in accordance with the present invention.

FIG. 8 shows the steps taken by all local bus devices 310 to process a burst. FIG. 9 shows the steps taken by a local bus device 310 when sourcing a burst. At the start of each burst, the Type bits of the data bus 342 are examined (STEP 800). If the Type bits indicate the beginning of a frame, the Busy bit, associated with the input FIFO 430 of the destination port logic device 310 listed in the start field 701, is set. Because this is done at all devices on the local bus, no other source port logic device 310 (i.e., device which transmits a burst over the local bus 340) will attempt to initiate a frame transfer to that destination port logic device 310 until the current frame transfer is completed.

If the receiving port logic device 310 is the destination port 310, then an attempt will be made to copy the data burst (STEP 805). If not, then the data logic 410 within the receiving logic port device 310 waits for the end field 705 of the burst. If an Abort signal is presented on the bus 340 before the end of frame is indicated by the Type bits (STEP 810), then the Busy bit associated with the destination port logic device 310 is cleared. If the end field 705 of the burst is received and it indicates end of frame (STEP 815), then the Busy bit associated with the destination port logic device 310 is cleared.

When the receiving port logic device 310 is the destination port logic device 310, then the receiving port logic device 310 checks whether its input FIFO 430 is empty (STEP 820). By requiring that the input FIFO 430 be empty before a burst will be accepted, a simple control mechanism is provided which allows data from only one burst into an input FIFO 430 at any one time. That is, by ensuring that the input FIFO 430 is empty, the receiving port logic device 310 does not need to determine what to do if the input FIFO 430 overflows. However, one skilled in the art will recognize that in an alternative embodiment, a more complex FIFO structure could be used which managed the receipt of a burst in such a way as to account for the rate at which the input FIFO 430 is emptied by the transmit buffer 440, the maximum size of a burst, and other factors which would allow the receiving port logic device 310 to manage receipt of a burst when the input FIFO 430 is not entirely empty. Furthermore, a more complex FIFO may be provided that supports receipt of more than one burst within the FIFO.

If the FIFO 430 cannot accept the burst, the receiving port logic device 310 asserts a Retry data bus signal line (STEP 840), doesn't write the burst into the FIFO 430, and waits for the end field 705 of the burst. The FIFO 430 may not be able to accept the burst because data previously loaded into the FIFO 430 has not been transferred to the buffer 440. This can occur if the data bus 342 is lightly loaded allowing a second burst to be attempted before the control 445 has been able to empty the FIFO 430 into the transmit buffer 440.

In the preferred embodiment the FIFO 430 must initially be empty. This allows the simplest FIFO control to be implemented. However, in an alternative embodiment of the present invention, the FIFO 430 only need to be sufficiently empty to accommodate the incoming burst. In the preferred embodiment, when the FIFO 430 is empty, the burst data is written to the FIFO 430 and through the FIFO 430 to the transmit buffer 440 (STEP 825). If there is a device related reason to abort the frame transfer (STEP 835), the transmit control 445 will flush the input FIFO 430 and any part of the aborted frame from the transmit buffer 440 (STEP 850) and assert the Abort data bus signal line on the local bus 340 (STEP 855). Asserting the Abort data bus signal line will cause the data logic 410 in each port logic device 310 to clear the Busy bit associated with the destination port logic device 310 (STEP 810). In addition, asserting the Abort data bus signal line will cause the source port logic device 310 to cease sending any more bursts for this frame.

All devices watch for the end field 705. When the Type bits indicate an end of frame, all the port logic devices 310 clear the Busy bit associated with the destination port logic device 310 of that burst. The end field 705 also may contain device specific information. For example, in the preferred embodiment, the frame length and status of a CRC check of the data received by the Network bus interface 490 may be included in the end field 705.

The source port logic device 310 which sends the data burst generates the end field 705 and preferably all of the information contained therein. Referring now to FIG. 9, in accordance with one embodiment of the present invention, when a port logic device 310 is to source a burst, the burst data is loaded into the output FIFO 460 (STEP 900). When sufficient data is loaded into the FIFO 460 and the Busy bit associated with the destination port logic device 310 is clear, the source device arbitrates for the bus 340 (STEP 910). If the Busy bit for the destination port logic device 310 is set before the bus 340 is granted, the source will wait for the Busy bit to be cleared, at which time STEP 910 will be reattempted. Thus, in the preferred embodiment, the source port logic device 310 waits until the destination port logic device 310 is available. The principal reason for this is to provide a simple method for reassembly of a frame segmented into multiple bursts, and to simplify transmit buffer management. One skilled in the art will easily recognize how this concept can be adapted to use of multiple Busy bits and/or more complex buffer management schemes. An additional benefit for LAN type devices is that it preserves the ordering of frames received from a LAN 312. Using a more complex buffer management approach, the output FIFO 460 could be flushed when the busy bit is set and another device is ready to transfer data. A circumstance where this would be appropriate is to transfer another frame addressed to a different port logic device 310. In an application of the present invention to other device types, for example within a computer system, it may be desirable to flush a transfer awaiting transmission to the LAN interface in order to attempt a transfer to a disk drive device, for example.

When the bus 340 is granted for the transfer, the source port logic device 310 places the start field 701 of the burst onto the bus 340 (STEP 920) with the appropriate type encoding (e.g., start of frame or start of burst) being signalled by the Type bits. The source port logic device 310 then bursts the data from the output FIFO 460 onto the bus 340 (STEP 930). If the destination port logic device 310 asserts the Retry data bus signal, the source port logic device 310 will stop the data burst, flush the FIFO 460, and retry the burst later (STEP 950). If the destination port logic device 310 asserts the Abort data bus signal, the source port logic device 310 will stop the data burst, flush the FIFO 460, and clear the frame from the receive buffer 470 (STEP 960).

In the normal case, the burst will continue without interruption. When the data burst is complete, the source port logic device 310 places the end field 705 onto the bus 340 (STEP 940) with the appropriate type encoding (e.g., end of burst or end of frame) being indicated by the Type bits.

Special Features of the Preferred Embodiment

The preceding description of the bus generally uses the model of a single destination port 310 for a frame. An important function of a local area network switch is properly handling multicast frames. A multicast frame is defined as a frame which is to be received by all stations and which could be of interest to all stations on the network. In the simple case, a multicast frame is forwarded by a source port logic device 310 to all other port logic devices 310 in the switch 300. With the addition of a multicast input FIFO 435 to each port logic device 310, and a single Busy bit for all devices, an efficient forwarding mechanism is implemented in accordance with the present invention.

The basic sequence of FIG. 8 is enhanced to implement the multicast feature. In STEP 800, if a bit in the start field indicates that the burst is multicast, and the Type bits indicate the beginning of a frame, then the Multicast Busy bit is set. This is done independent of destination and source port logic device address. Similarly, the Busy bit cleared in STEP 810 and STEP 815 is the Multicast Busy bit.

In the simple case, because the frame is multicast, all port logic devices 310 except the source port logic device 310 are a destination port logic device 310. However, in accordance with the present invention, the functionality of a switch 300 is improved by allowing separation of the stations 390 connected through the port logic devices 310 into multiple virtual networks. To create a virtual network with the local bus 340, a network identifier subfield is added to the start field 701 of a burst. The contents of the subfield network identifier can then be compared against a list of virtual networks supported by the receiving port logic device 310. If the virtual network is supported, then the receiving port logic device 310 is a destination port logic device 310 for that burst and burst processing continues at STEP 820. Note that a separate Busy bit must be associated with each virtual network and maintained within each port logic device 310, or a single bit must be set and reset based on the virtual network affiliation of the ports in the network. If the virtual network is not supported by the receiving port logic device 310, then it will not copy the burst and waits to process the end field 705. Accordingly, the Multicast Busy bit associated with the virtual network is cleared upon receipt of the end of frame.

The start field 701 can also be used to convey additional information for buffer management. For example, a retry policy specified in the start field 701 could force the transition to STEP 840 when there is not sufficient space in the frame buffer 440 for a maximum length frame, even when the FIFO 430 is empty.

The features of the local bus 340 also allow different modes for forwarding a frame. The bus 340 allows forwarding when enough data has been received to fill a first burst. In this mode, the end field 705 can be used to supply the reception status of the frame to the destination port logic device 310. This information could then be used to abort the frame transmission at the port logic device 310.

Bus Clocking

In accordance with the present invention, the local bus 340 uses synchronous transceiver clocking to simplify VLSI design, improve rate scaling and provide flexibility in system configuration. The same bus clocking techniques are used for the lookup bus 341 and the data bus 342. In accordance with the preferred embodiment of the present invention, a complete clock cycle is allocated for turning off bus drivers. This produces many benefits. For example, the one cycle turn-off time prevents two drivers from being turned on at the same time. In busses where "turn around" (i.e., a change in the device that drives the bus) is asynchronous, this driver overlap condition is more common because of the difficulties in satisfying logic hold times with clock skew, signal propagation variance, and driver tolerances contributing to uncertainty as to when a driver is turned off. Such uncertainty increases the potential for overlap. In addition to providing greater system reliability by eliminating driver overlap, the current invention simplifies system design by removing most of these complex timing factors from the design.

The speed at which an asynchronous bus operates is significantly limited by the time allocated to driver turn-on and turn-off. Allocation of a full clock period for turn-off in the synchronous bus of the present invention allows better rate scaling by eliminating driver turn-on and turn-off considerations from bus cycles which occur when the bus is being driven from a single source. In asynchronous busses, little can be done to improve the turn-off and turn-on times. Therefore, they must be treated as constants within each bus cycle. As the bus rate increases, the cycle time decreases, leaving less time for clock skew, signal propagation, and set up times. With the synchronous design of the present invention, the turn-off time no longer has the same effect. The present invention also eases the signal rise and fall time requirements for the bus drivers, which in turn simplifies inclusion of the bus interface within VLSI chips. Allowing a system to operate with slower rise and fall times can also decrease the electronic emissions from a system.

The inventive local bus 340 turns the bus around based on bus signals that accompany the data (i.e., an idle state), rather than requiring every cycle to have sufficient time to accommodate a turn around. This allows the turn around to automatically scale for the needs of the system.

Figure 10:
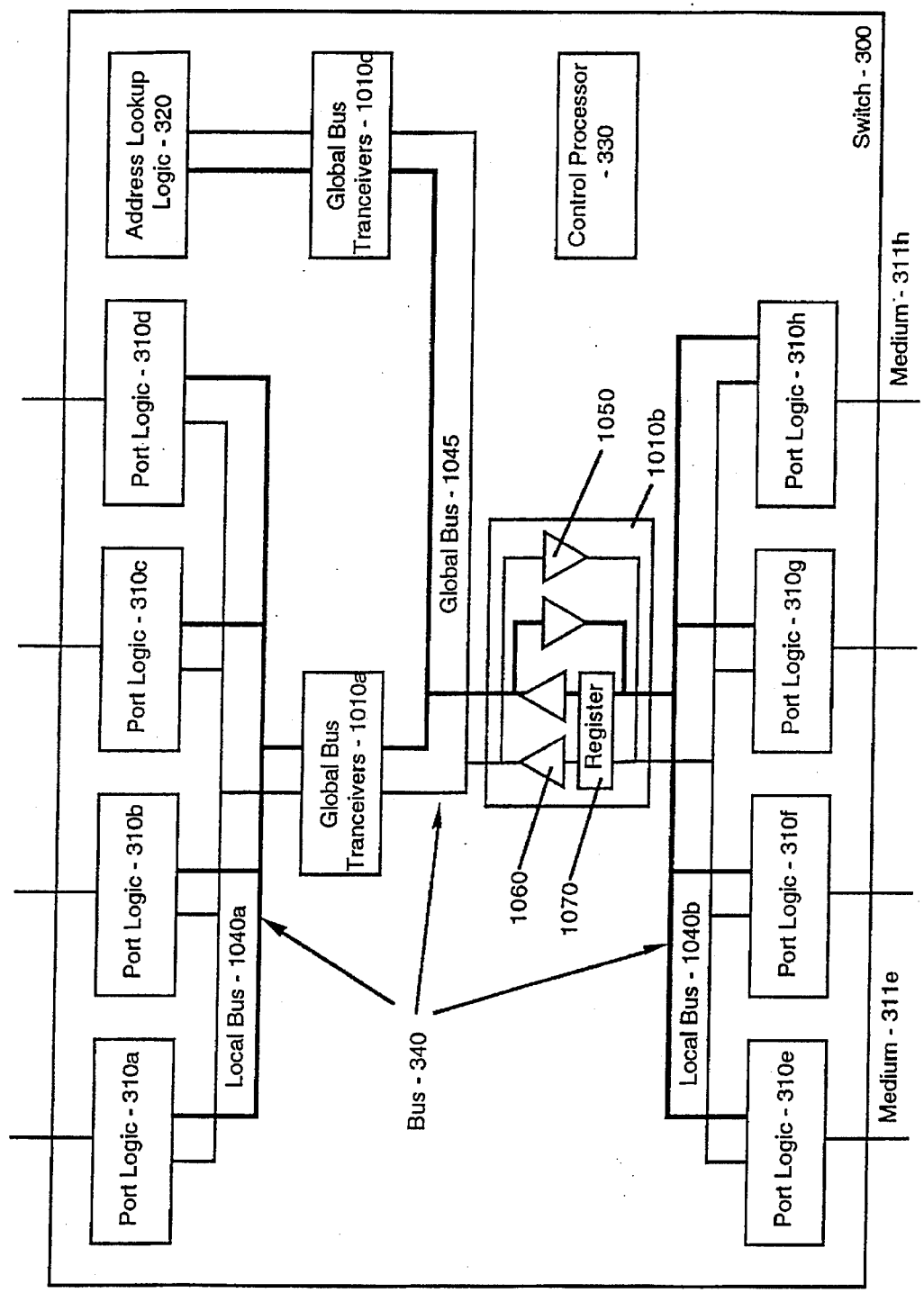
FIG. 10 illustrates the preferred embodiment of the inventive bus in greater detail.

The present invention as shown in FIG. 3 is preferably implemented as shown in FIG. 10. In accordance with the preferred embodiment of the present invention, the local bus 340 is divided into at least two levels; at least two primary local busses and at least one global bus. The primary local busses 1040*a*, 1040*b* are of limited size such that a VLSI based port logic device 310 has practical driver requirements. Global transceivers 1010*a*, 1010*b* are then used to expand the bus 340 to a global bus 1045 which interconnects the primary local busses 1040 to one another and to the global address lookup logic 320. Each global transceiver 1010 preferably comprises a register 1070 having a relatively high current driver 1060 at the output for driving the global bus 1045, and a relatively low current driver 1050 for buffering data received from the global bus 1045 and driving the associated local bus 1040. The drivers 1050 within each global transceiver 1010 that drive the local bus 1040 need not have very high current capability, since the local busses 1040 preferably represent a relatively light load. However, the global bus 1045 could interconnect dozens of local busses 1040 resulting in a configuration of hundreds of port logic devices 310. Therefore, the drivers 1060 preferably have relatively high current drive capability.

Figure 11:
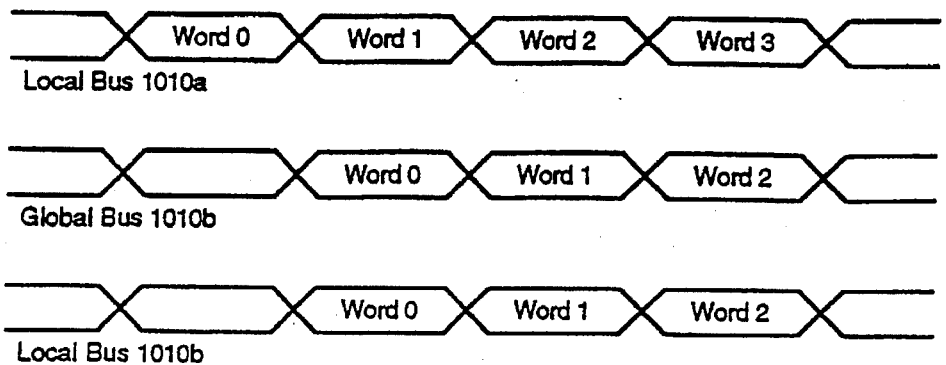
FIG. 11 illustrates the timing of the configuration illustrated in FIG. 10.

The configuration illustrated in FIG. 10 preferably uses the timing illustrated in FIG. 11. If the port logic device 310*a* is sourcing data to the local bus 340, then the global transceiver 1045 uses the register 1070 and the driver 1060 to delay the data by one clock period before driving the data onto the global bus 1045. In accordance with the preferred embodiment, data transmitted from a global bus 1045 to a local bus 1040 is not delayed (except as required by propagation delays through the transceiver 1010).

Figure 12:
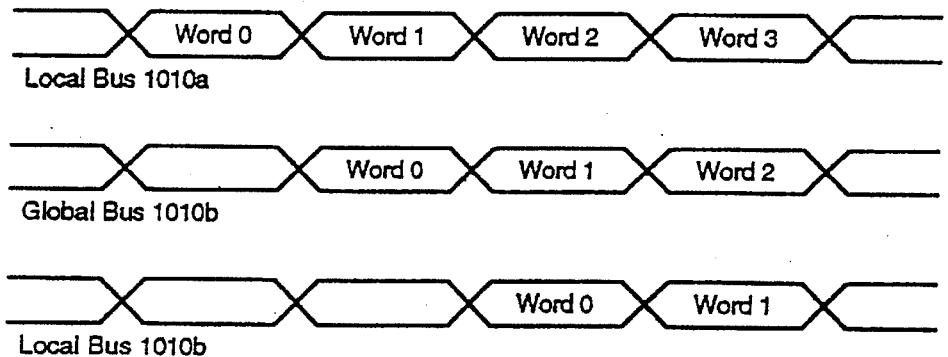
FIG. 12 illustrates an alternative timing of the configuration illustrated in FIG. 10.

However, an alternative clocking scheme might be required in very large systems. Such an alternative clocking scheme is illustrated in FIG. 12, where clocked transceivers 1010 are also used to delay the data by at least one clock cycle when driving data from the global bus 1045 to the primary local bus 1040*b* as well as from the primary local bus 1040*a* to the global bus 1045.

Figure 13:
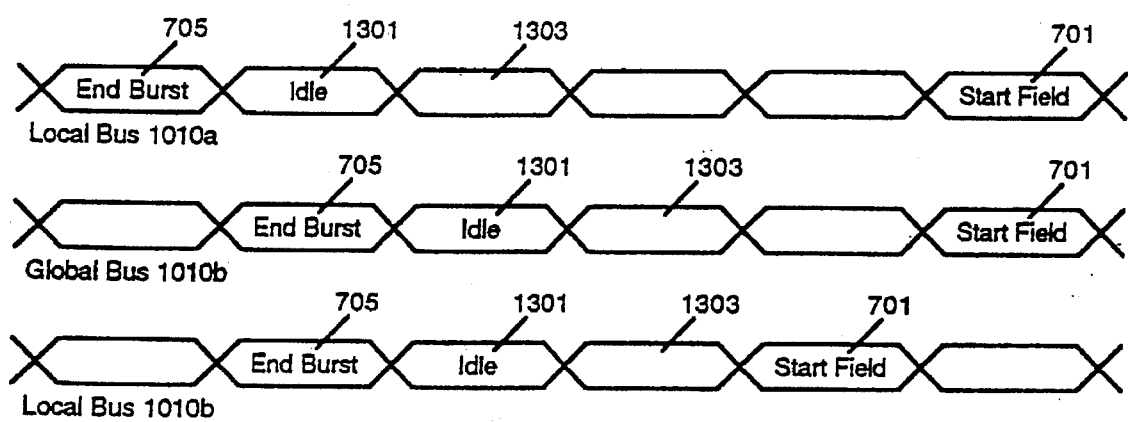
FIG. 13 illustrates the timing at a bus turn around in accordance with the present invention.

FIG. 13 illustrates the effect of the clocked transceiver in the turn around of the bus 340 in the preferred embodiment. This example assumes that a port logic device 310 on primary local bus 1010*a* is transmitting, and the next port logic device 310 to transfer a burst is on local bus 1010*b*. As illustrated in FIG. 13, the transmitting port logic device 310 on local bus 1010*a* sends an end field 705 of a burst and then drives all of the bus lines to the state they will attain when no device is driving the bus, (which in one embodiment is a TTL high due to pullup resistors on the bus; with other technologies the level may differ). This state is defined as an Idle state 1301. Because the bus is driven to the desired state prior to mining off the drivers, current sourcing (or sinking) devices used to control the state of the bus when no device is driving the bus do not have to source (or sink) as much current as they would if they were responsible for changing the state of the bus lines. The drivers are turned off in the next clock cycle 1303. In accordance with the preferred embodiment of the present invention, a port logic device 310 that has been granted the bus 340 will wait for an Idle state 1301 signaling that the bus 340 is available. The port logic device 310 then waits one full cycle and then turns on its drivers at the next clock cycle and begins its burst with a start field 701. In cases where the next burst is from a port logic device 310 on the same primary local bus 1040, the turn around time would be reduced by one clock, because the Idle state 1301 is received earlier. Therefore, system efficiency is improved by ordering arbitration grants during heavy load so that port logic devices 310 on the same primary local bus 1040 are given transfer opportunities back-to-back (i.e., in succession, without any intervening transfers).

Conclusion

The present invention provides a bus architecture that allow the bus to be scaled such that an increase in the bus rate provides a proportional increase in the performance of the bus. Furthermore, in accordance with the present invention, a port logic device 310 may be fabricated using current VLSI technology and yet may drive a bus 340 that supports a very large number of number of other port logic devices. These port logic devices may be coupled to a number of stations, such as workstations, personal computers, or other network end stations. However, in an alternative embodiment of the present invention, the port logic devices may be provided within end stations themselves. The use of global bus transceivers also provides a one bus cycle delay to data in one direction and no delay to data in a second direction to allow bus devices sufficient time to ensure that no driver overlap occurs. Thus, as long as one bus cycle is sufficient to ensure that a driver that was previously driving the bus is mined off, the turn off time (and consequently the turn on time) are not a factor that needs consideration when increasing the rate of bus. In the case in which the rate of the bus is such that more than one clock cycle is required to ensure that each driver is completely turned off before another driver begins driving the bus, the present invention can easily be adapted to require that each port logic device 310 wait more than one bus cycle after the idle state is detected before driving the bus.

A number of embodiments of the present invention have been described. Nevertheless, it will be understood that various modifications may be made without departing from the spirit and scope of the invention. For example, the present invention may be used with any network protocol that can accommodate synchronous operation and delays of more than one clock cycle between transmission by a first port logic device and receipt of data by a second port logic device. Furthermore, present invention may be used in a broad range of devices other than LAN switches and bridges. For example, the present invention may be used as a local bus within a personal computer to couple devices such as disk drives, tape drives, memory, microprocessors, video processors, etc. Still further, it should be understood that any number of clock cycles may required after the detection of an idle state by a port logic device. Accordingly, it is to be understood that the invention is not to be limited by the specific illustrated embodiment, but only by the scope of the appended claims.

We claim:

1. A bus interface device, configured to be coupled to at least one synchronous bus having a substantially continuous bus clock and to a bus device, for transmitting data in bursts from a coupled bus device onto at least one coupled bus, the data being synchronized with cycles of the bus clock, the bus interface device includes delay logic that delays the bus interface device at least one full bus clock cycle after a last bit of a data burst has been transmitted from another device on the bus before the bus interface device starts to transmit a next data burst on the bus.

2. A system for transferring data from a first bus device coupled to the bus to a second bus device, comprising:
   (a) at least one local bus having at least one data line on which data may be transmitted between bus devices in synchronism with a bus clock; and
   (b) a plurality of interface devices, each interface device being coupled to at least one of the busses and to a bus device, for transmitting data in bursts from the coupled bus device onto the bus;
wherein each interface device waits a delay of at least one full bus clock cycle after a last bit of data is transmitted from another device on the bus before starting to transmit data on the bus.

3. The system of claim 2, wherein each interface device transmits an idle state one full cycle after transmitting the last bit of a burst of data on the bus.

4. The system of claim 3, wherein the idle cycle transmitted drives each data line to the state that it attains when no device is driving the bus.

5. The system of claim 3, wherein each local bus includes at least one address lookup bus, and wherein at least one interface device includes a storage device and transmits a response to an address lookup request received over the at least one address lookup bus if the requested address is present in the storage device, the response including identification of the responding interface device.

6. The system of claim 5, wherein at least one address lookup bus comprises the data lines of the local bus.

7. A system for transferring bursts of data from a first bus device coupled to the bus to a second bus device, comprising:
   (a) at least one local bus having at least one data line on which data may be transmitted between bus devices in synchronism with a bus clock; and
   (b) a plurality of interface devices, each interface device being coupled to at least one of the busses and to a bus device, for transmitting data in bursts from the coupled bus device onto the bus;
wherein each interface device asserts an idle state on each data line of the bus for one full bus clock cycle after transmitting the last bit of a burst of data.

8. The system of claims 2 or 7, wherein each local bus includes at least one address lookup bus, and further including at least one lookup logic device for receiving address lookup requests over the at least one address lookup bus and transmitting an associated address lookup response containing the address of an interface device identified within each associated address lookup request.

9. The system of claim 3 or 8, further including:
   (a) a global bus for transferring data between local busses;
   (b) a plurality of global bus transceivers, each coupled to a unique corresponding local bus and to the global bus, each global bus transceiver for transferring data between a device coupled through an interface device to the corresponding local bus and at least one other global bus transceiver, each global bus transceiver causing a delay of at least one full clock cycle after an interface device has ceased transmitting over a local bus before transmitting data on the global bus to another global bus transceiver.

10. The system of claims 2, 3, or 7, further including:

(a) a global bus for transferring data between local busses;

(b) a plurality of global bus transceivers, each coupled to a unique corresponding local bus and to the global bus, each global bus transceiver for transferring data between the corresponding local bus and the global bus, each global bus transceiver causing a delay of at least one full clock cycle between receipt of data from a local bus and transmission of the data on the global bus.

11. The system of claim 10, wherein each interface device includes a register for generating the delay between the receipt of data on the local bus and the transmission of data on the global bus.

12. The system of claim 10, wherein each global bus transceiver includes a relatively high current driver for driving data received from the corresponding local bus onto the global bus.

13. The system of claim 10, further including:

(a) a plurality of additional global busses; and (b) a plurality of additional global bus transceivers, each additional global bus transceiver being coupled to a first and a second global bus, each additional global bus transceiver for transferring data between the first and second global bus;

wherein each additional global bus transceiver waits at least one full clock cycle after receiving data from one global bus before transmitting the data on the other global bus.

14. The system of claim 10, wherein each global bus transceiver transmits an idle state for at least one full bus cycle on a global bus after transmitting the last bit of a burst of data on that global bus.

15. The system of claim 2, 3, or 7 further including at least one dedicated address lookup bus, coupled to a plurality of interface devices and configured to be coupled to at least one lookup logic device, for transferring an address lookup request from a first interface device to a lookup logic device, and for transferring a response to the request from the lookup logic device to the requesting interface device.

16. A synchronous bus, having a substantially continuous bus clock, for transferring data from a first bus device to a second bus device synchronized with cycles of the bus clock, the bus including a data bus and a dedicated address lookup bus each configured to be coupled to at least two attached interface devices, the data bus for transferring data between at least two such attached interface devices, the address lookup bus being further configured to be coupled to at least one lookup logic device, for transferring an address lookup request from a first interface device to a lookup logic device, and for transferring a response to the request from the lookup logic device to the requesting interface device.

17. The bus of claim 16, further including an address lookup logic device for receiving address lookup requests and transmitting an address lookup response to the requesting device.

18. The bus of claim 16, wherein at least one interface device includes a storage device for storing addresses of other interface devices, and for associating each such stored address with the address of a station coupled to that interface device, such interface device addresses being stored in the storage device when data which includes the address of the station and the interface device to which the station is coupled is received in the interface device.

19. The bus of claim 18, wherein only the addresses of stations that are coupled directly to the interface device are stored within the storage device.

20. The bus of claim 18, wherein the storage device is a content addressable memory.

21. The bus of claim 18, wherein at least a first interface device accesses the contents of a storage device within the first interface device to determine the address of a station to which data is intended to be transmitted, and only if the address of the station is not within the storage device, transmits the data on the local bus to which that first interface device is coupled.

22. The bus of claim 18, wherein an interface device which includes storage devices transmits a response to address lookup requests which include the address of a station identified in the address lookup requests if that address is present in the storage device within that interface device.

23. A port logic device configured to be coupled to a bus, the bus having at least one other port logic device coupled thereto, for transferring frames of data to another port logic device, including:

(a) a receive storage area for retaining data to be transmitted to a transmit storage area within another port logic device coupled to the bus; and (b) at least one Busy bit, each Busy bit being associated with a unique corresponding transmit storage area within another port logic device coupled to the bus, each Busy bit being set by the port logic device when a first word of a frame of data to be received in the transmit storage area associated with that Busy bit is detected by the port logic device, and that Busy bit being cleared by the port logic device when the last word of the frame of data is detected by the port logic device;

whereby data retained within the receive storage area of the port logic device is not transmitted to any transmit storage area within another port logic device associated with a Busy bit that is set.

24. The port logic device of claim 23, wherein the port logic device detects when the first word of a frame of data has been transmitted by monitoring at least one Type bit transmitted on the bus.

25. The port logic device of claim 23, wherein the port logic device detects when the first word of a data burst has been transmitted by monitoring at least one Type bit transmitted on the bus.

26. The port logic device of claim 23, wherein the port logic device detects when the last word of a frame of data has been transmitted by monitoring at least one Type bit transmitted on the bus.

27. The port logic device of claim 23, wherein the port logic device detects when the last word of a data burst has been transmitted by monitoring a Type bit transmitted on the bus.

28. The port logic device of claim 24, 25, 26 or 27, wherein the Type bits are detected on a bus line that is distinct from the bus lines used to transmit the data bits that comprise a frame of data.

29. The port logic device of claim 23, wherein the port logic device waits a delay of at least one full bus clock cycle after a last bit of data is received from another device on the bus before starting to transmit data on the bus.

30. The port logic device of claim 23, further including a storage device, wherein the port logic device transmits a response to an address lookup request if that address is present in the storage device, the response including the address of a station identified in the address lookup request.

* * * * *